Oct. 30, 1934.    R. H. OLLEY    1,978,882
ELECTRIC FITTING FOR CONDUIT OUTLET BOXES
Filed July 15, 1932
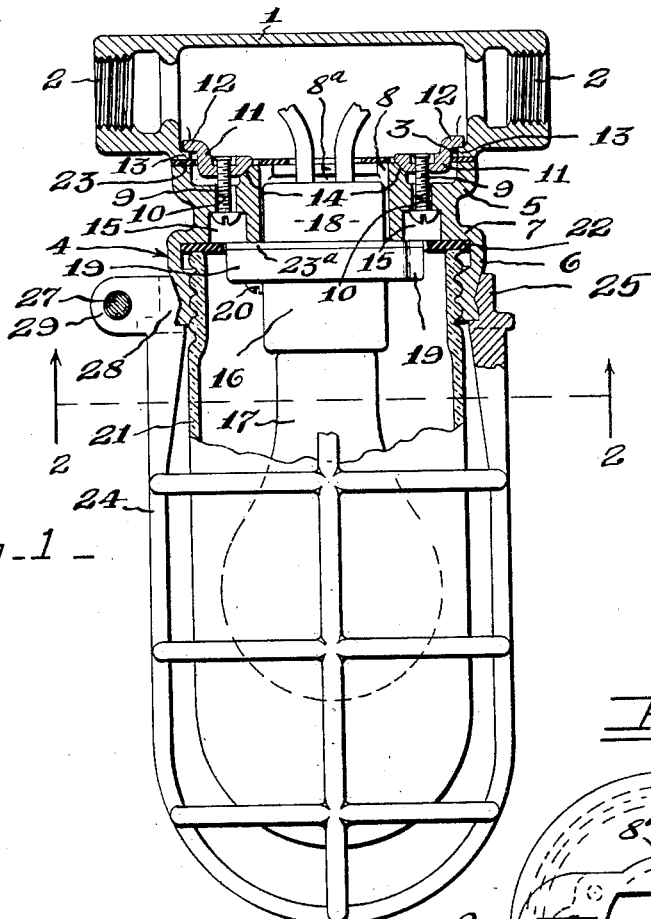
Fig-1-
Fig-2-
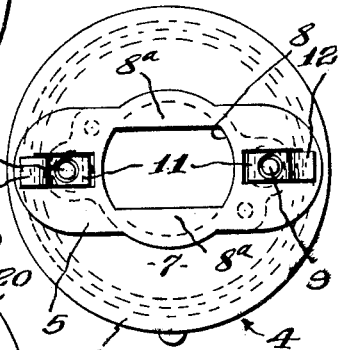
Fig-4-
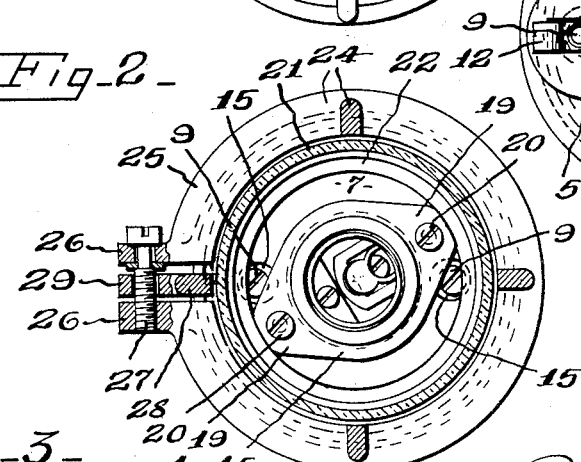
Fig-3-
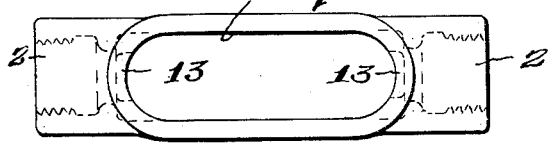
INVENTOR.
Raymond H. Olley
BY
Bodell & Thompson
ATTORNEYS.

Patented Oct. 30, 1934

1,978,882

UNITED STATES PATENT OFFICE 1,978,882

ELECTRIC FITTING FOR CONDUIT OUTLET BOXES

Raymond H. Olley, Syracuse, N. Y., assignor to Crouse-Hinds Company, Syracuse, N. Y., a corporation of New York Application July 15, 1932, Serial No. 622,678

3 Claims. (Cl. 240—11.2)

This invention relates to electric conduit fittings for supporting electric lamps, and a globe around the lamp and also, a guard or cage for protecting the globe, and has for its object, a fitting which can be attached to the conventional conduit outlet boxes having the usual oblong openings for the outlet of wires, and which forms a cover for said opening.

It further has for its object, a fastening means for the base, which fastening means is accessible through the open side of the fitting, that is, the side on which the lamp and globe are disposed, whereby the fastening means is not exposed when the fitting, lamp, and globe are assembled on the outlet box.

The invention consists in the novel features and in the combinations and constructions hereinafter set forth and claimed.

In describing this invention, reference is had to the accompanying drawing in which like characters designate corresponding parts in all the views.

Figure 1 is a sectional view, partly in elevation, of this electrical fitting showing the same applied to a conduit outlet box.

Figure 2 is a sectional view on line 2—2, Figure 1.

Figure 3 is a plan view of the outlet box.

Figure 4 is a plan view of the fitting.

This electric fitting comprises generally, a body having a base, oblong in general form, for forming a cover for the oblong opening of the conduit outlet box, and a cylindrical cap rigid, or integral, with the base, the base having a wire passage opening into the outlet box and into the cap through the bottom thereof, means for securing the base to the box, a lamp socket having its base mounted on the bottom of the cap in line with said passage, and a globe extending into the cap and coacting with the cylindrical wall thereof.

1 designates a conduit outlet box, which is oblong in general form, having means, as one or more internally threaded nipples 2, for connection in an electrical conduit system enclosing the service wires, the box also having an oblong outlet opening 3.

4 designates the fixture, this comprising a body having an oblong base 5, and a cap 6, the base extending diametrically of the bottom 7 of the cap and having a passage 8 therethrough which opens into the box and through the bottom of the cap, this opening being for the purpose of permitting the electric wires to be led out of the outlet box to the terminals, or binding devices, of the lamp socket. This passage is cylindrical at its lower end to receive the hub of the lamp socket base. The upper end of this passage, where it opens into the outlet box, is partly closed by webs 8ª making the passage oblong at its upper end to conform to the open side of the outlet box.

The base is secured to the open side of the outlet box 1 by fastening means which are accessible through the cap, this fastening means being here shown as including screws 9 extending through passages 10 on opposite sides of the opening 8, and nuts 11 into which the screws thread, the nuts having portions 12 for hooking under overhanging walls 13 provided at the ends of the oblong opening 3 and also preferably, having surfaces 14 for coacting incline plane fashion with complemental surfaces on the base for wedging the nuts snugly into engagement with the wall or shoulders 13 when the screws are tightened.

The heads of the screws are located in countersinks 15 which open through the bottom wall of the cap so that the screws are accessible through the cap when the globe and lamp, to be presently described, are removed.

16 designates the base of a lamp socket, or equivalent device for a lamp bulb 17. This base is formed of insulating material and is mounted on the bottom of the cap 6 in line with the opening 8, it usually having a cylindrical end portion 18 extending into the opening 8. The base 16 is also formed with flange portions or lugs 19 lapping the bottom wall of the cap and secured thereto as by screws 20 extending through the flange portions and into threaded openings in the bottom of the cap. The lugs are so located as not to cover the countersink 15.

21 designates the glass globe, this being usually cylindrical in general form and having its upper end extending into the cylindrical wall of the cap and secured therein. As here shown, the cap and the upper annular end of the globe is formed with interlocking means, as screw threads, for holding the globe in position. Preferably, the globe at its upper end seats against a gasket 22 interposed between it and the bottom of the cap. Also, gaskets 23 and 23ª are preferably interposed respectively between the base 5 and the wall of the outlet box around the opening 3 and the flange portion 19 of the lamp socket base and the bottom 7 of the cap.

24 designates a guard, or cage, having a ring 25 at its upper end enclosing and secured to the cylindrical wall of the cap and preferably, the ring 25 is split and provided with oppositely extending lugs 26 on opposite ends of the split ring, through which a clamping screw 27 extends, the screw threading into one of the lugs only in order to have a clamping action.

As here illustrated, the globe includes lengthwise bars and transverse rings, and the upper end of one of the bars extends at 28 between the split ends of the ring 25 and is provided with an outwardly extending lug 29 through which the screw 27 extends.

This fitting is particularly advantageous in that it supports the globe for the lamp and is attachable to an oblong conduit outlet box and further in that the fastening means by which it is secured to the box are located within the fitting and operable through the open side of the cap.

What I claim is:

1. An electric conduit fitting for a conduit outlet box having an oblong opening, said fitting comprising a body having a base oblong in general form for forming a closure for the oblong opening of the box and having a cylindrical cap, the base having a passage therethrough opening into the bottom of the cap, a lamp socket mounted in the cap in line with said opening, means mounted on the base and operable from within the cap to move into engagement with the side wall of the opening of the box to secure the fitting to the outlet box, and a globe having an annular portion extending into the cylindrical wall of the cap, said cylindrical wall and the annular portion of the globe having coacting means for securing the globe in the cap.

2. An electric conduit fitting for a conduit outlet box having an oblong opening, said fitting comprising a body having a base oblong in general form for forming the closure for the oblong opening of the box and a cylindrical cap portion, a passage formed in the base and extending through the bottom of the cap portion, a lamp socket secured in the cap with its wire terminals extending into said passage, means mounted on the base at one side of said passage and operable from within the cap to move into engagement with the side wall of the opening of the outlet box to secure the fitting to the same, and a globe having an annular portion extending into the cap, said annular portion of the globe and the cylindrical wall of the cap having means cooperable to secure the globe in the cap.

3. An electric conduit fitting for a conduit outlet box having an oblong opening at one side thereof, said fitting comprising a body formed with a base oblong in general form complemental with the oblong opening of the outlet box, and a cap portion, said base portion having a passage formed centrally thereof and extending through the bottom wall of the cap portion, a lamp socket secured in the cap portion having its wire terminals extending into said passage, means mounted on the base on opposite sides of said passage and operable from within the cap for engaging the side walls of the opening of the outlet box to secure the fitting thereto, a globe detachably secured within the cap portion and a guard detachably secured to the periphery of the cap portion.

RAYMOND H. OLLEY.